United States Patent
Ilie Razvan

(10) Patent No.: US 11,835,083 B2
(45) Date of Patent: Dec. 5, 2023

(54) ASSEMBLY FOR LOCKING TWO PARTS BY A BAYONET SYSTEM, AND CORRESPONDING METHOD

(71) Applicant: Stephane Ilie Razvan, Rocquencourt (FR)

(72) Inventor: Stephane Ilie Razvan, Rocquencourt (FR)

(73) Assignee: Stephane Ilie Razvan, Rocquencourt (FR)

( * ) Notice: Subject to any disclaimer, the term of this patent is extended or adjusted under 35 U.S.C. 154(b) by 514 days.

(21) Appl. No.: 17/142,472

(22) Filed: Jan. 6, 2021

(65) Prior Publication Data

US 2021/0207634 A1     Jul. 8, 2021

(30) Foreign Application Priority Data

Jan. 8, 2020   (FR) ...................................... 20 00128

(51) Int. Cl.
     *F16B 7/04*         (2006.01)
     *H01R 13/625*     (2006.01)
     *H01R 24/00*      (2011.01)

(52) U.S. Cl.
     CPC ........... *F16B 7/042* (2013.01); *H01R 13/625* (2013.01); *H01R 24/005* (2013.01)

(58) Field of Classification Search
None
See application file for complete search history.

(56) References Cited

U.S. PATENT DOCUMENTS

| 3,470,524 | A | | 9/1969 | Culver |
| 3,901,574 | A | * | 8/1975 | Paullus ................ H01R 13/623 |
| | | | | 285/401 |

(Continued)

FOREIGN PATENT DOCUMENTS

| CN | 110571591 A1 | 12/2019 |
| FR | 3068092 A1 | 12/2018 |

OTHER PUBLICATIONS

French Search Report for FR 20 00128 dated Jun. 22, 2020.

*Primary Examiner* — Briggitte R. Hammond
(74) *Attorney, Agent, or Firm* — Duane Morris LLP

(57) ABSTRACT

Assembly comprising a first part and a second part movable relative to each other in translation along a connection axis between a locked configuration and an unlocked configuration. The first part comprises one of a rail and a groove, and the second part comprises the other, the rail being configured to slide axially in the groove. The assembly comprises a ring rotatably mounted on the first part about the connection axis, the ring comprising at least one pin. The second part defines a locking ramp, a first housing and an unlocking ramp. The assembly comprises a return system for exerting a return force on the ring to a position of rest. The locking ramp and the first housing are so designed that a manual movement causes a first sliding of the pin on the locking ramp, and an automatic movement of the ring angularly in one direction between the position of rest and a first intermediate position, then an automatic displacement of the ring angularly in the opposite direction from the first intermediate position to a locking position under the action of the return system, the pin being received in the first housing, the first housing defining a first axial stop designed to block the pin axially. The unlocking ramp is so designed that a manual movement of the rotating ring in said direction from the locking position releases the pin from the first housing and causes a (Continued)

Figure 1:
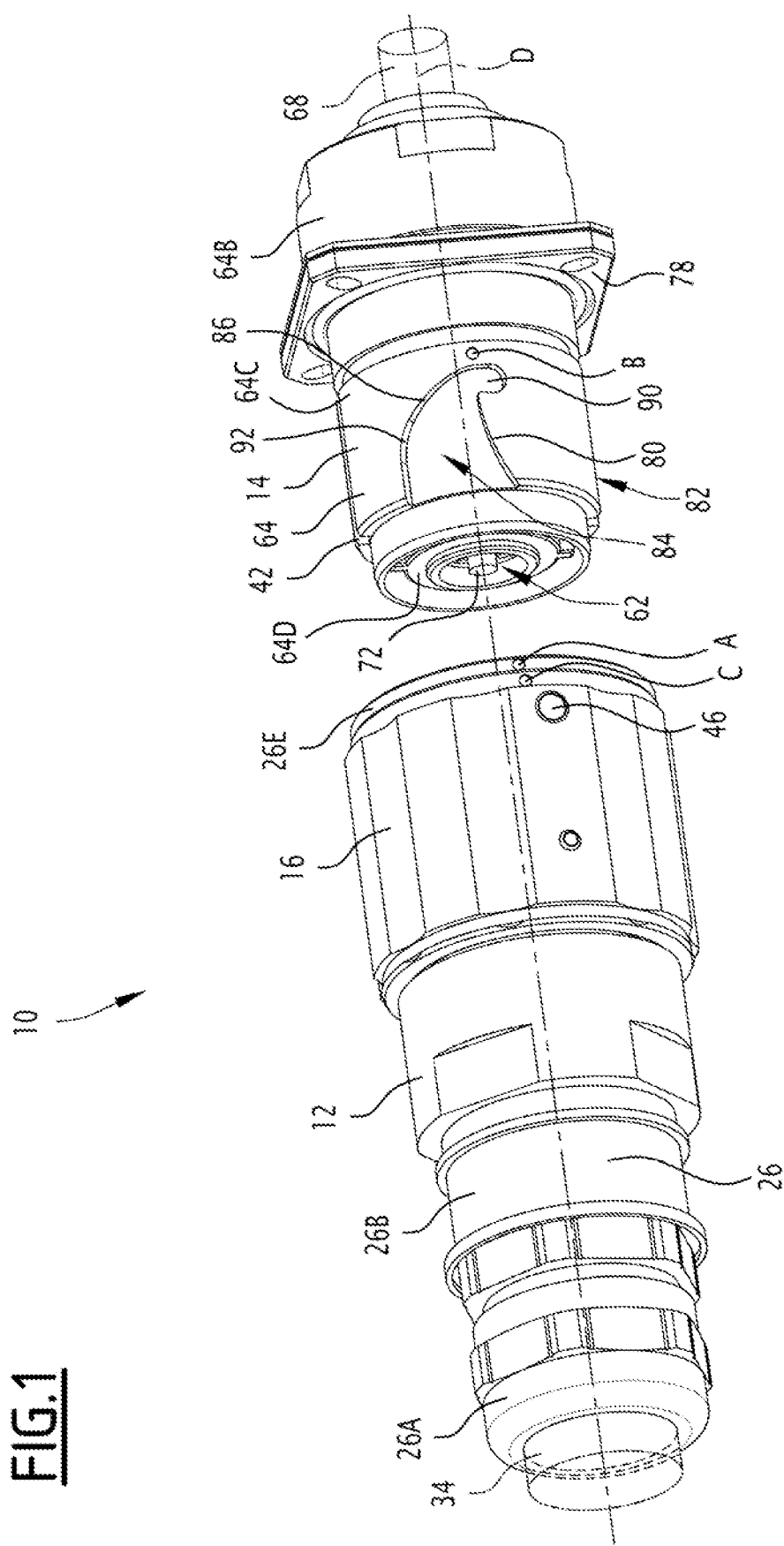

second sliding of the pin on the unlocking ramp, the unlocking ramp reacting axially on the pin to move the first part and the second part away from each other from the locked configuration.

11 Claims, 12 Drawing Sheets

(56) References Cited

U.S. PATENT DOCUMENTS

| | | |
|---|---|---|
| 6,386,897 B1 | 5/2002 | Muller |
| 7,681,925 B2 | 3/2010 | Lambert et al. |
| 7,731,243 B2 | 6/2010 | Tiberghien et al. |
| 9,531,125 B2 * | 12/2016 | Fan ..................... H01R 13/625 |
| 10,630,024 B1 * | 4/2020 | Su ..................... H01R 13/6271 |

* cited by examiner

ASSEMBLY FOR LOCKING TWO PARTS BY A BAYONET SYSTEM, AND CORRESPONDING METHOD

RELATED APPLICATIONS

The present application claims priority benefit of French Application No. FR 20 00128 filed on Jan. 8, 2020, the contents of which is incorporated by reference in its entirety.

BACKGROUND OF THE INVENTION

Field of the Invention

The present invention relates to an assembly comprising a first part and a second part movable relative to one another between a locked configuration, in which the first part and the second part are partly nested one inside the other and locked to each other, and an unlocked configuration, in which the first part and the second part are separated from each other.

The invention also relates to a corresponding locking-unlocking method.

Description of Related Art

Such an assembly is used for example to connect and disconnect two electric cables.

Existing bayonet assemblies offer good robustness, but questionable ergonomics. In fact, the fact of having to perform a rotational movement to ensure the locking of the two parts is sometimes considered tiresome by a user.

An object of the invention is therefore to provide an assembly as described above which offers locking that is as robust as the bayonet assemblies themselves, while offering better ergonomics.

BRIEF SUMMARY OF THE INVENTION

To this end, the invention relates to an assembly comprising a first part and a second part movable relative to one another in translation along a connection axis between a locked configuration, in which the first part and the second part are partly nested within each other and locked to each other, and an unlocked configuration, in which the first part and the second part are separated from each other, in which:

the first part comprises a rail or a groove, while the second part comprises a corresponding groove or rail, the rail being designed to slide axially in the groove when the first part and the second part pass from the unlocked configuration to the locked configuration, the assembly comprises a ring mounted to rotate on the first part around the connection axis, the ring defining a radially inner surface with respect to the connection axis and comprising at least one pin, the pin projecting from the radially inner surface, the second part defines a locking ramp, a first housing and an unlocking ramp, and the assembly comprises a return system to exert a return force on the ring to pass to a position of rest, the locking ramp and the first housing being designed so that a manual displacement of the first part and of the second part axially relative to each other from the unlocked configuration to an intermediate configuration causes a first sliding of the pin on the locking ramp, and an automatic displacement of the ring angularly in one direction relative to the first part between the position of rest and a first intermediate position, and so that a manual displacement of the first part and the second part axially relative to one another from the intermediate configuration to the locked configuration allows automatic displacement of the ring angularly in the opposite direction with respect to the first, from the first intermediate position to a locking position under the action of the return system, the pin being received in the first housing when the ring is in the locking position, the first housing defining a first axial stop designed to block the pin axially relative to the second part, the unlocking ramp being so designed that a manual displacement of the rotating ring about the connection axis in said direction with respect to the first part from the locking position makes the pin leave from the first housing and causes a second sliding of the pin on the unlocking ramp, the unlocking ramp reacting axially on the pin to move the first part and the second part axially away from each other from the locked configuration.

According to particular embodiments, the assembly includes one or more of the following features, taken alone or in any technically feasible combination:

the first part comprises one of a male electrical contact and a female electrical contact, and a first electrical insulating sleeve surrounding said electrical contact about the connection axis, the second part comprises the other of a male electrical contact and a female electrical contact, and a second electrical insulating sleeve surrounding said electrical contact about the connection axis, the electrical contact of the first part being in electrical contact with the electrical contact of the second part in the locked configuration, and separate from the electrical contact of the second part in the unlocked configuration;

the second part comprises a wall extending at least in part about the connection axis, the wall defining a radially outer surface forming a radial recess, the recess opening axially on the side of the first part, the locking ramp, the first housing and the unlocking ramp being formed by a curvilinear edge of the recess;

the first part comprises a wall extending at least in part about the connection axis, the wall defining a slot extending perpendicular to the connection axis, the pin passing radially through this slot;

the return system comprises a groove formed by the first part or the ring and oriented circumferentially about the connection axis, and a spring housed in the groove, the spring having a first end fixed to the first part, and a second end fixed on the ring;

the unlocking ramp is curved, the unlocking ramp forming an angle with the connection axis narrowing as one moves away from the first housing;

the unlocking ramp comprises a part proximal to the first housing, the proximal part forming an angle of less than 40°, preferably 20°, with any plane perpendicular to the connection axis;

the assembly further comprises at least one O-ring seal fixed on one of the first part and the second part about the connection axis, the other of the first part and the second part defining a surface seal designed to interact with the seal in the locked configuration, the second sliding of the pin on the unlocking ramp from the first housing causing axial sliding of the seal on the sealing surface and axial separation between the seal and the seal surface; and the second part also defines a second housing designed to receive the pin at the end of the second sliding, the second housing defining a second axial stop blocking the pin axially relative to the second part, the second housing being furthermore designed to immobilize the ring in rotation in a second intermediate position relative to the first part when the pin is in the second housing, the second housing being so designed that manual movement of the rotating ring about the connection axis with respect to the first part in said opposite direction from the second intermediate position exits the pin from the second housing and allows axial displacement of the first part and of the second part with respect to each other towards the unlocked configuration.

The object of the invention is also a method for locking-unlocking a first part and a mobile part relative to each other in translation along a connection axis between a locked configuration, in which the first part and the second part is partly nested one inside the other and locked to each other, and an unlocked configuration, in which the first part and the second part are spaced apart from each other, the first part comprising one of a rail and a groove, and the second part comprising the other of a rail and a groove, a ring being rotatably mounted on the first part about the connection axis, the ring defining a radially inner surface with respect to the connection axis and comprising at least one pin, the pin projecting from the radially inner surface, the second part defining a locking ramp, a first housing and an unlocking ramp, a return system exerting a return force on the ring towards a position of rest relative to the first part, the method comprising the following steps:

sliding of the rail axially in the groove when the first part and the second part pass from the unlocked configuration to the locked configuration, manual movement of the first part and the second part axially with respect to one another from the unlocked configuration to an intermediate configuration, due to said manual displacement, first sliding of the pin on the locking ramp, and automatic displacement of the ring angularly in one direction with respect to the first part between the position of rest and a first intermediate position, manual movement of the first part and the second part axially relative to each other from the intermediate configuration to the locked configuration, due to said manual displacement, automatic displacement of the ring relative to the first part angularly in the opposite direction from the first intermediate position to a locking position under the action of the return system, the pin being received in the first housing when the ring is in the locking position, the first housing defining a first axial stop blocking the pin axially relative to the second part, manual displacement of the rotating ring around the connection axis in said direction relative to the first part from the locking position, and due to said manual movement, exit of the pin from the first housing and second sliding of the pin on the unlocking ramp, the unlocking ramp reacting axially on the pin to move the first part and the second part axially away from each other from the locked configuration.

BRIEF DESCRIPTION OF THE SEVERAL VIEWS OF THE DRAWING(S)

Figure 2:
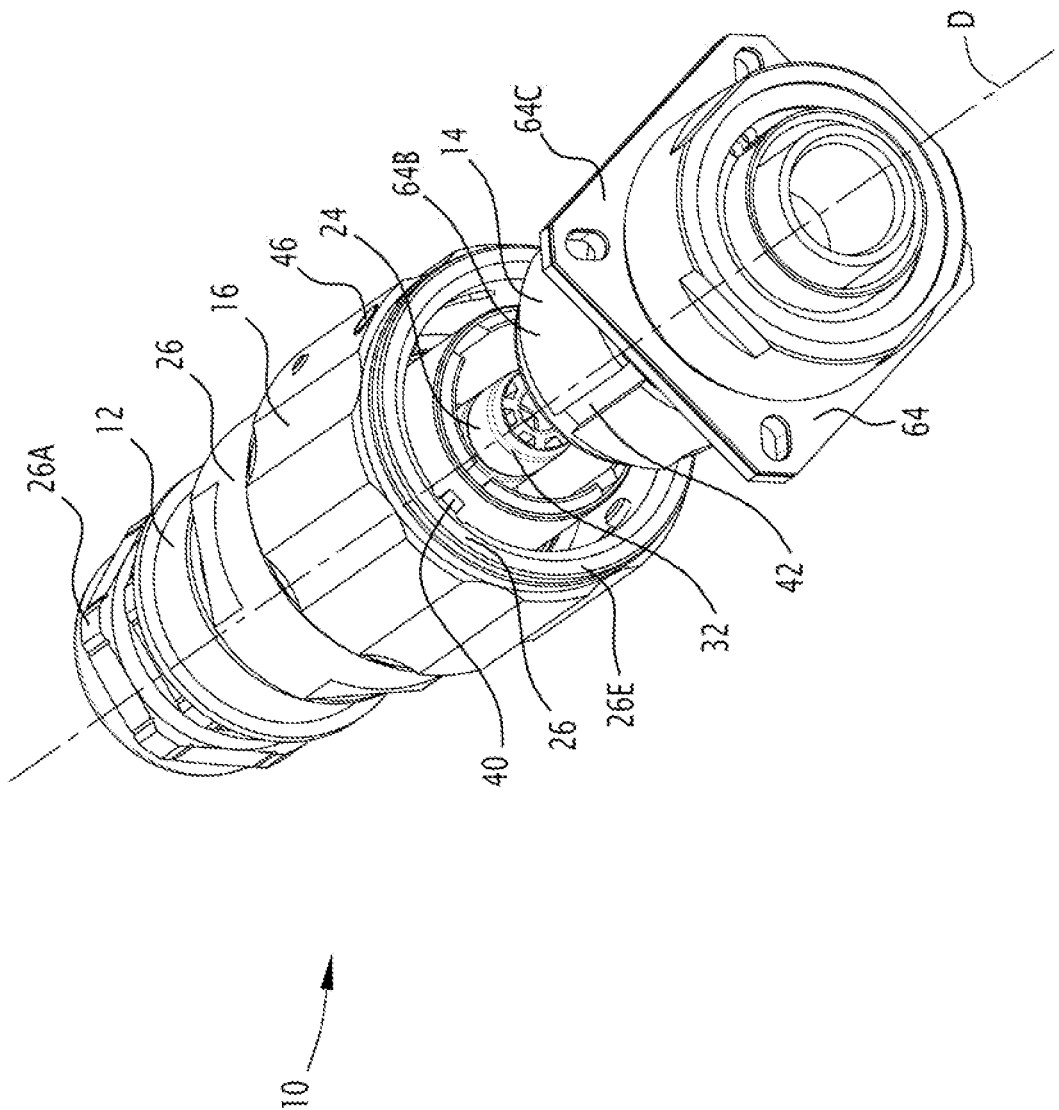
Figure 3:
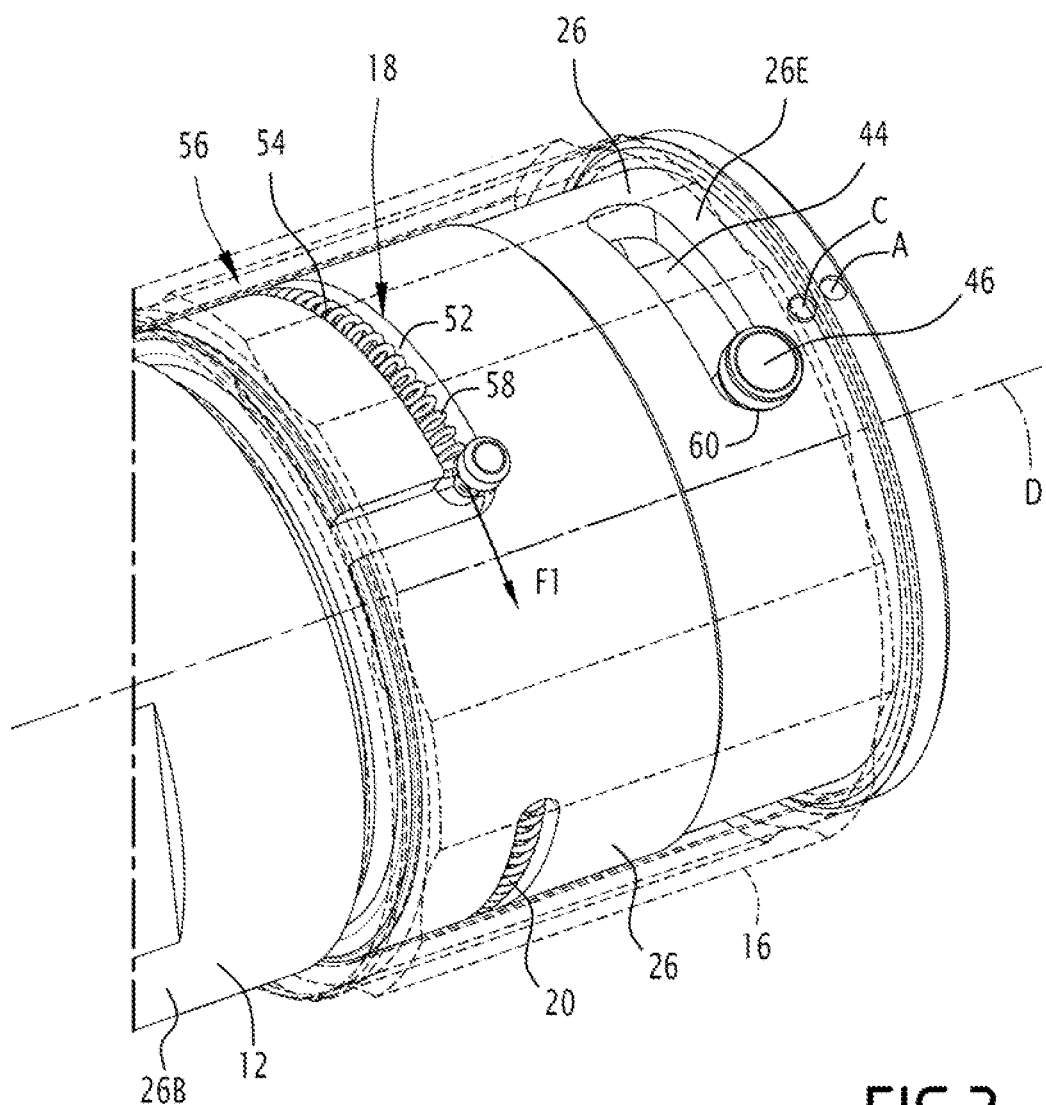
Figure 4:
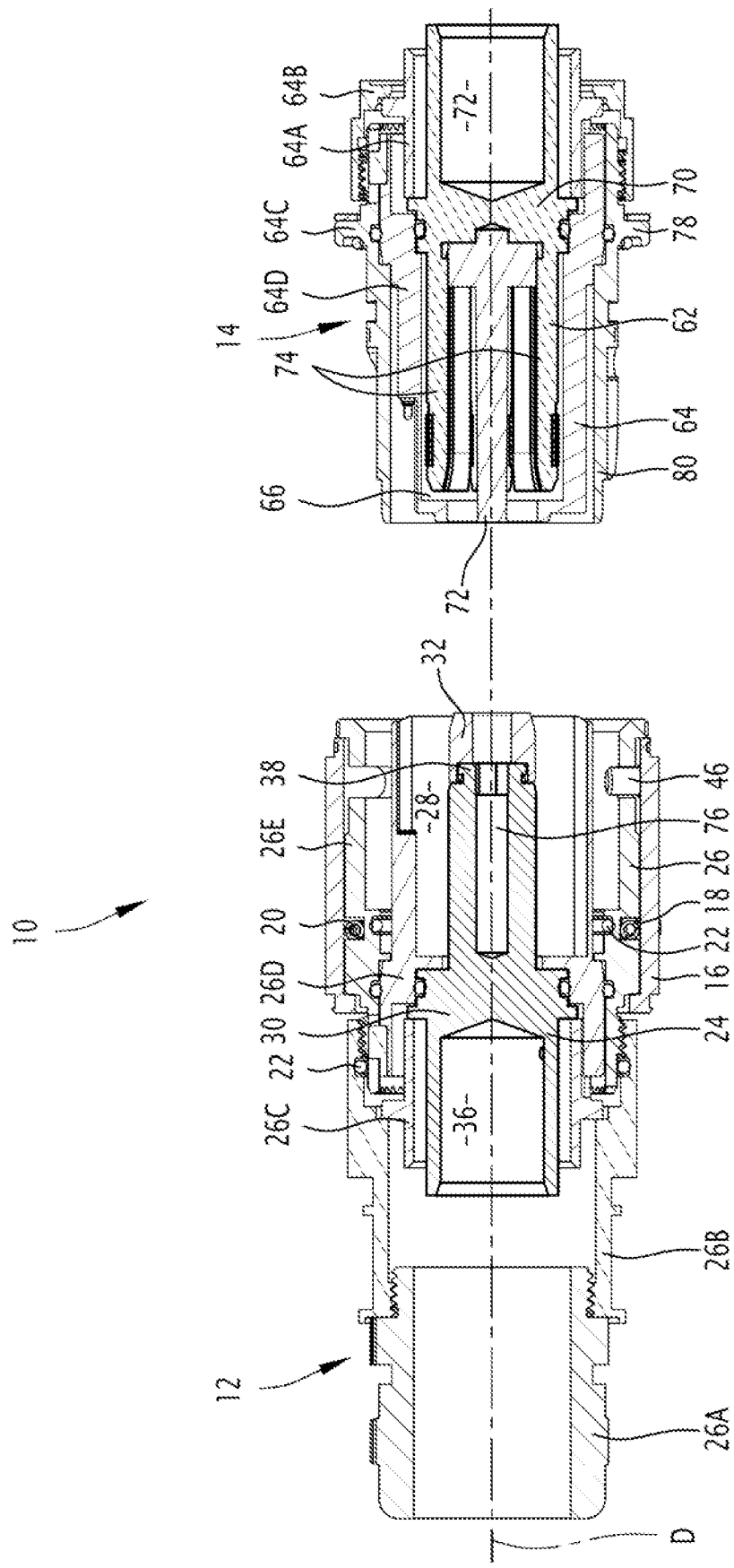
Figure 5:
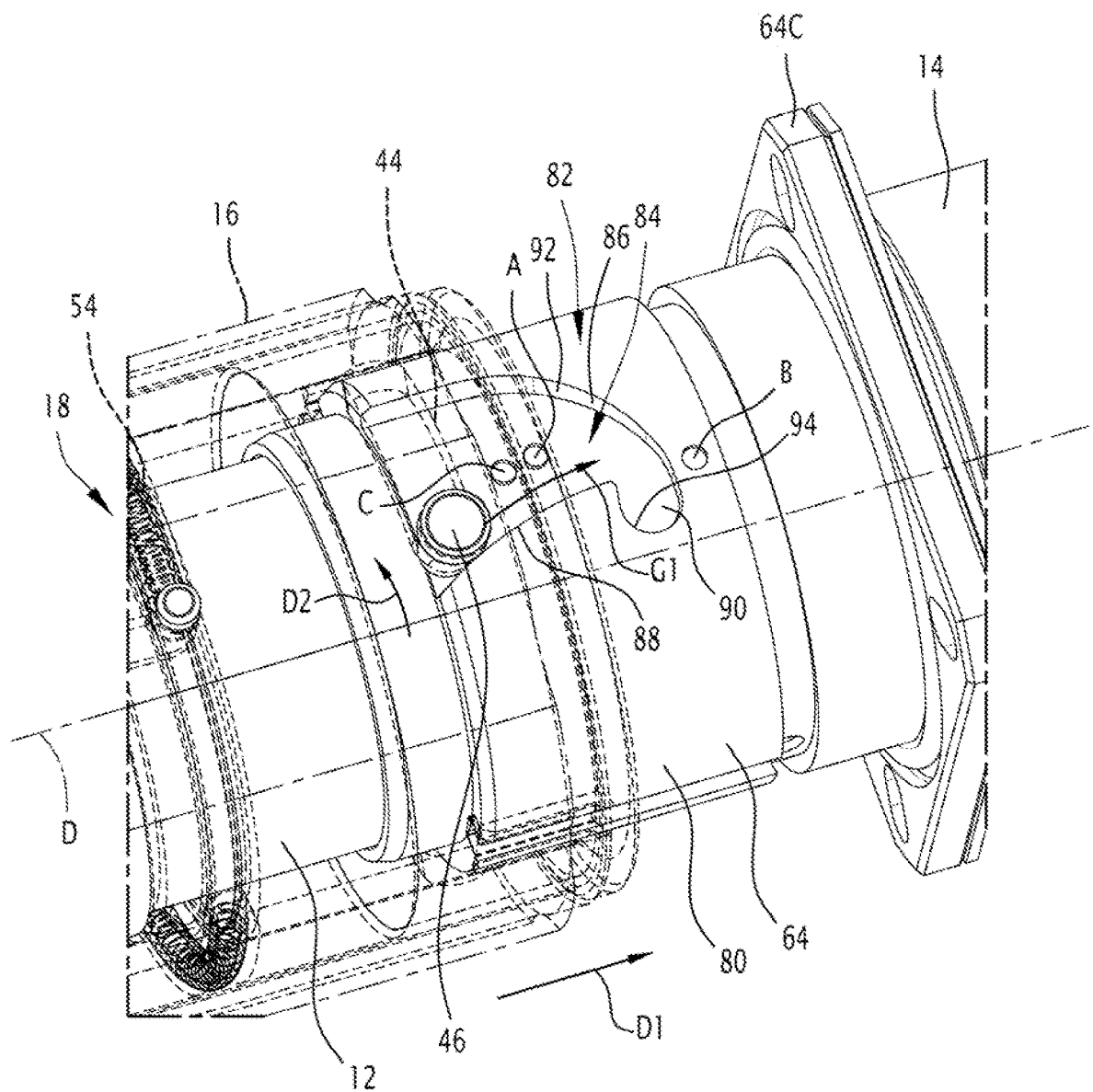
Figure 6:
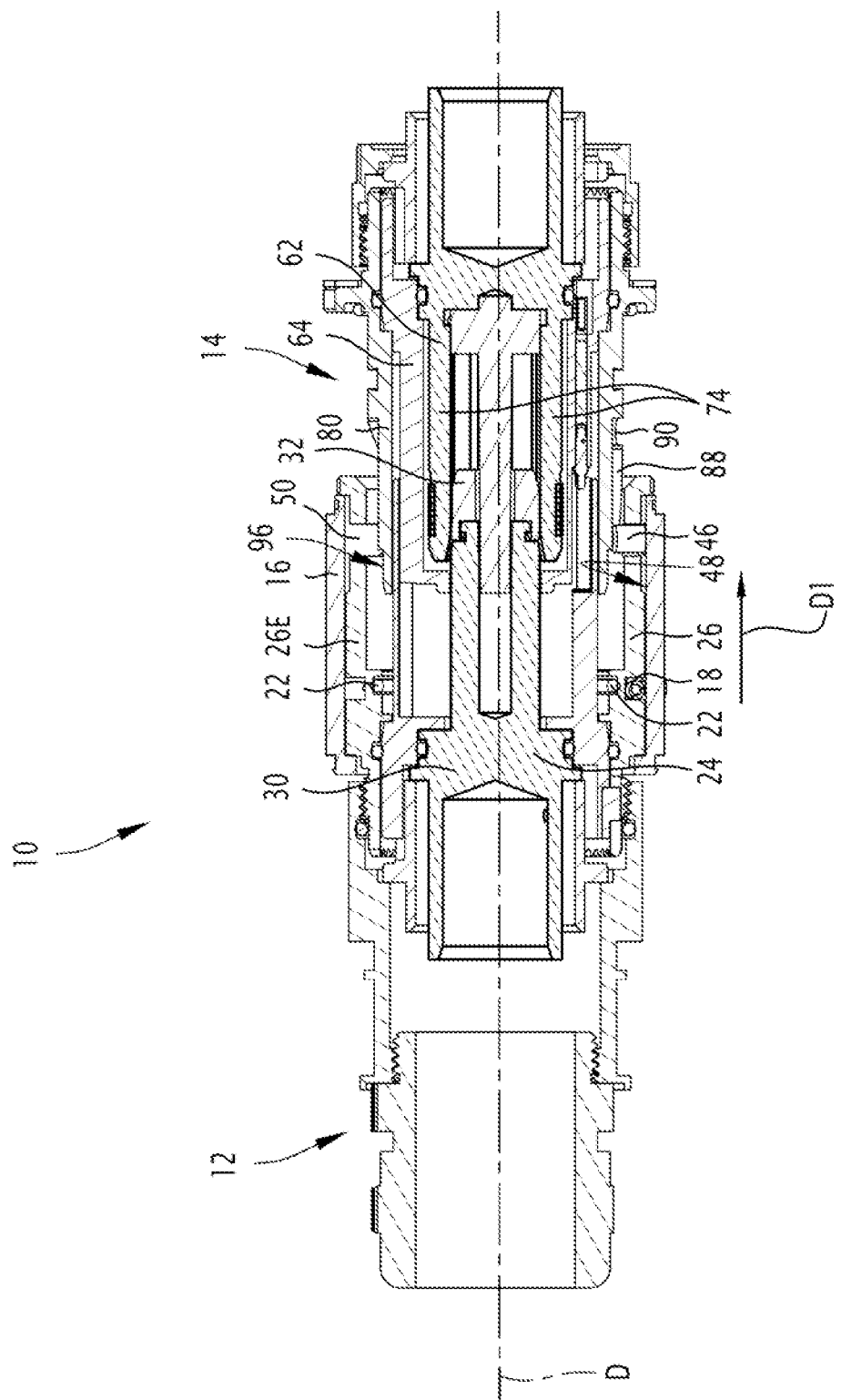
Figure 7:
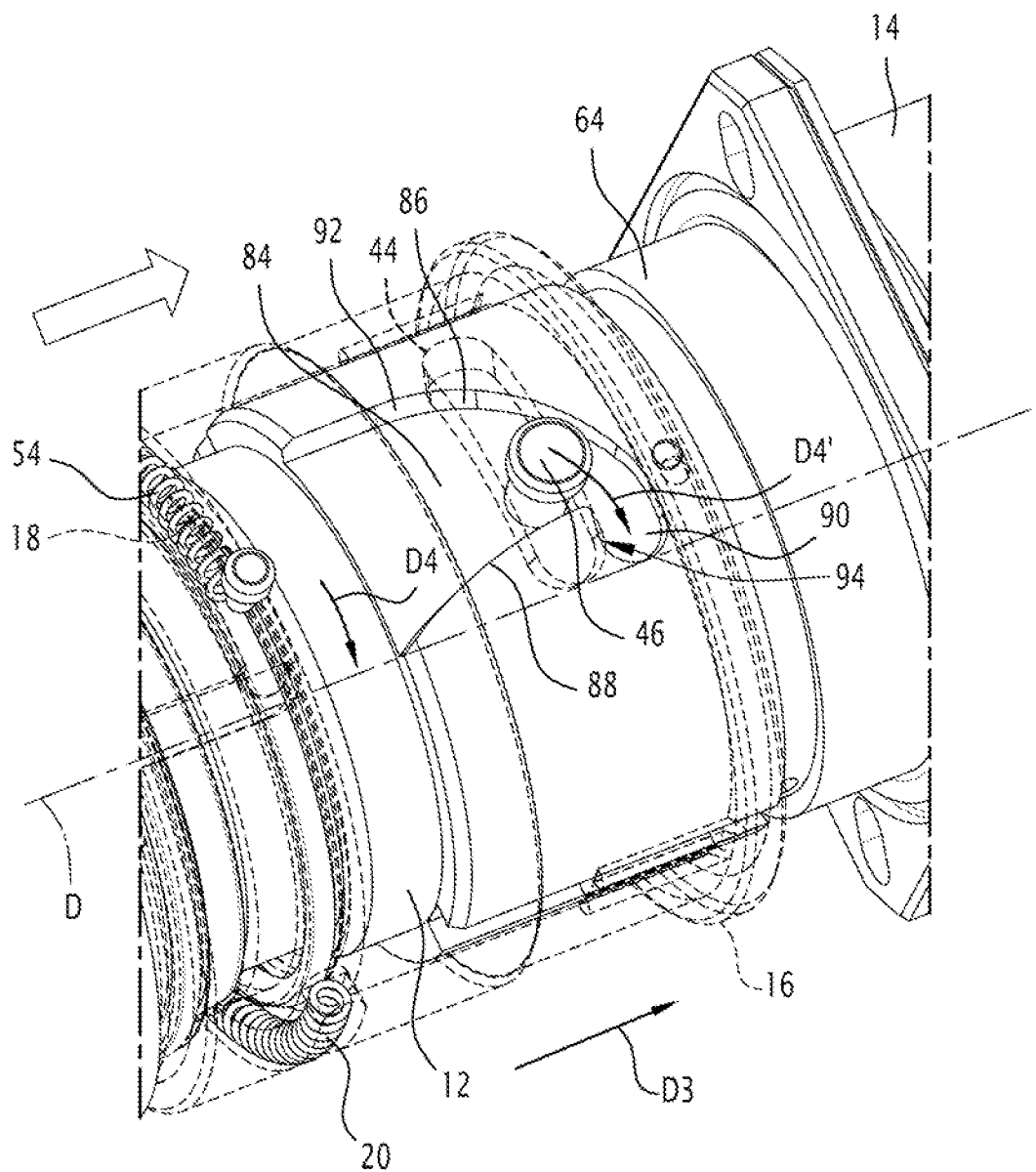
Figure 8:
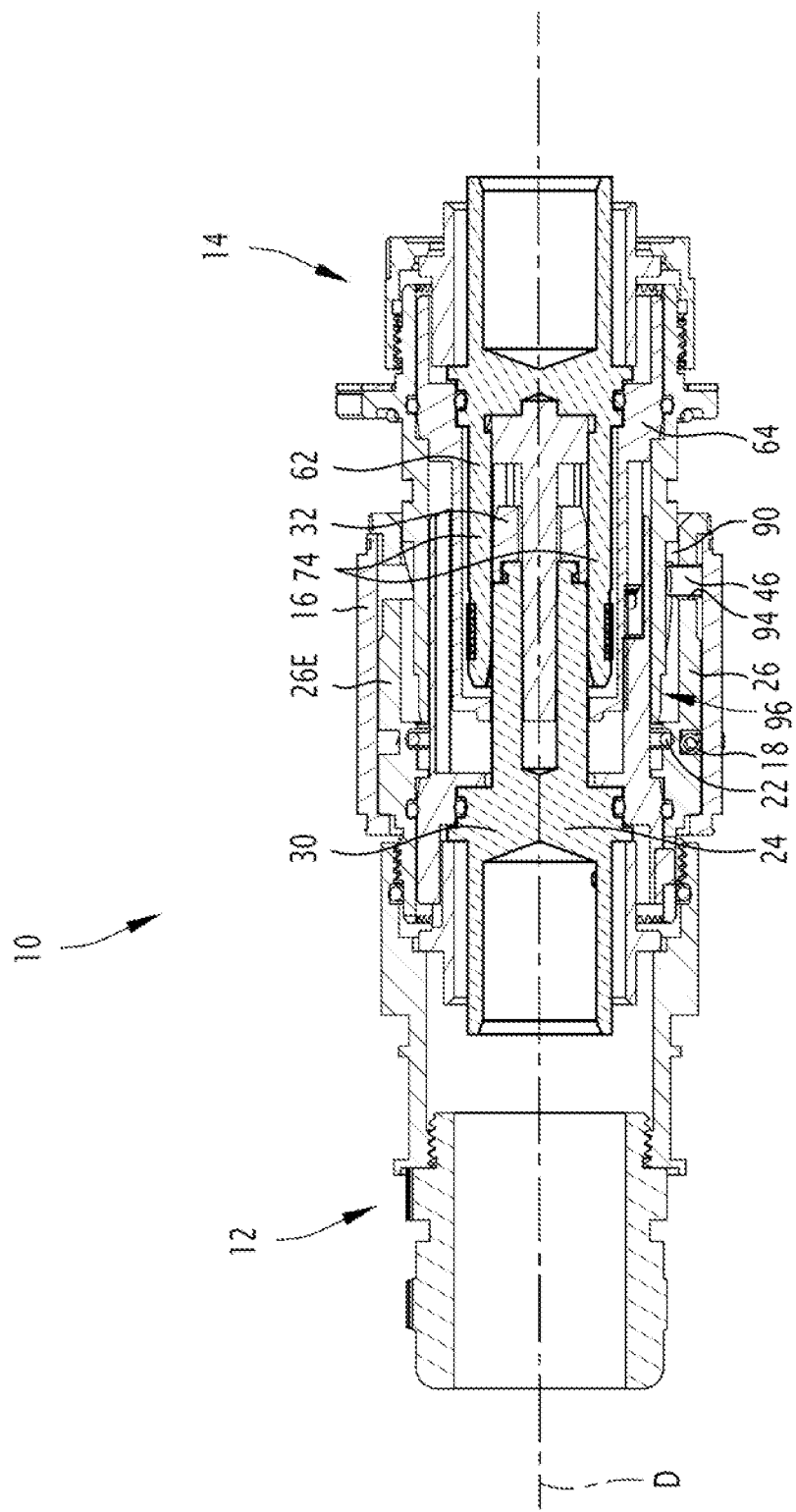
Figure 9:
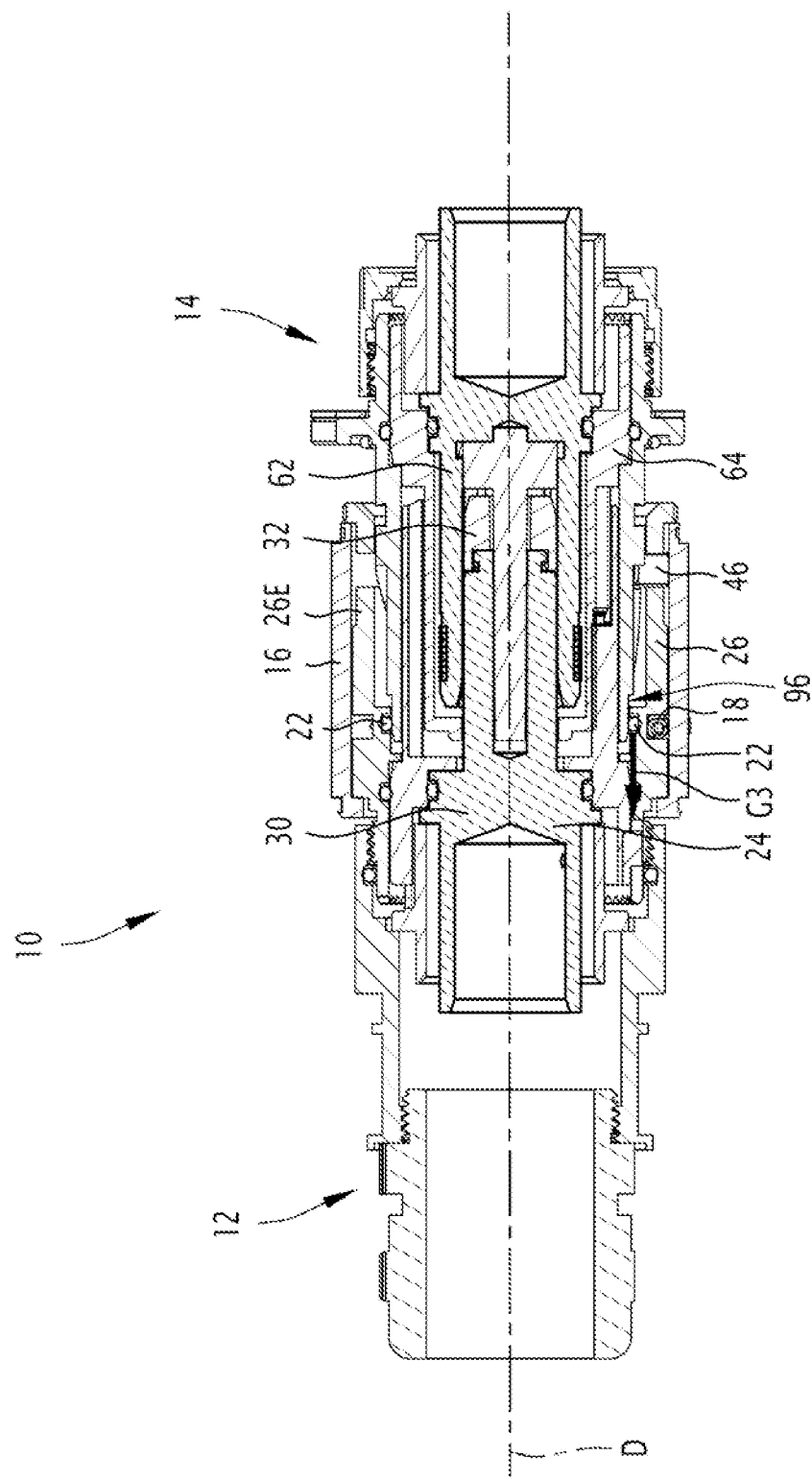
Figure 10:
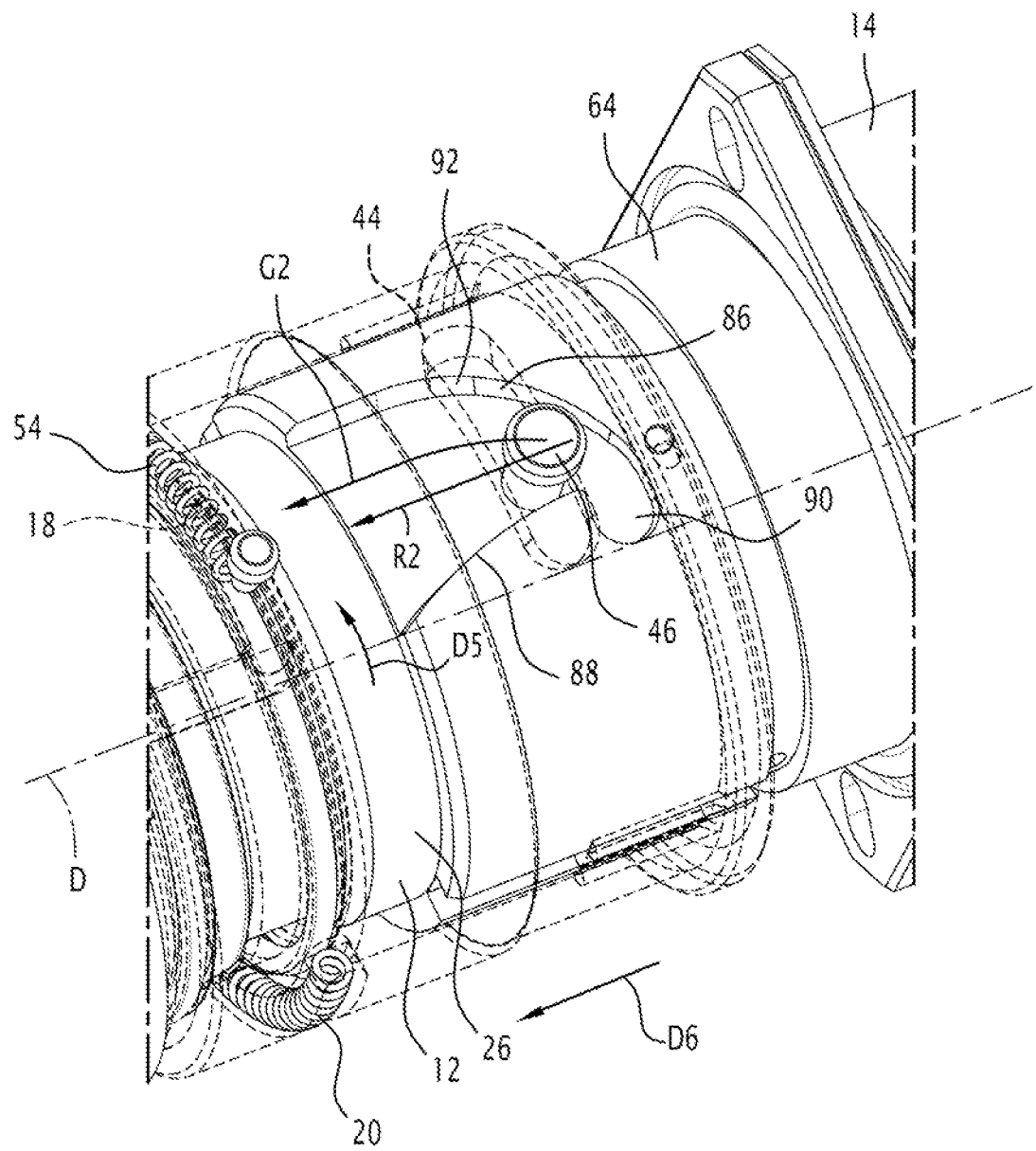
Figure 11:
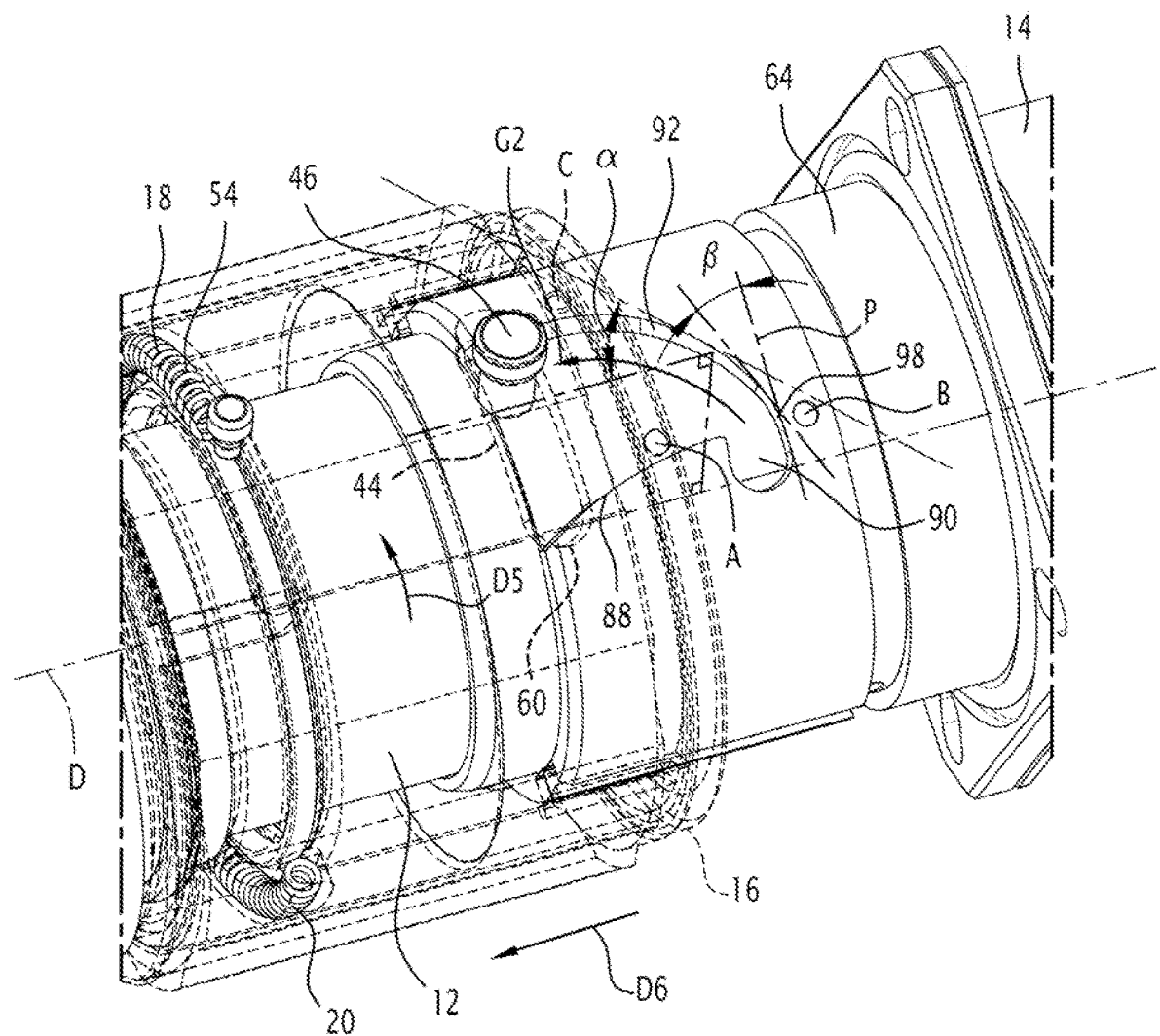
Figure 12:
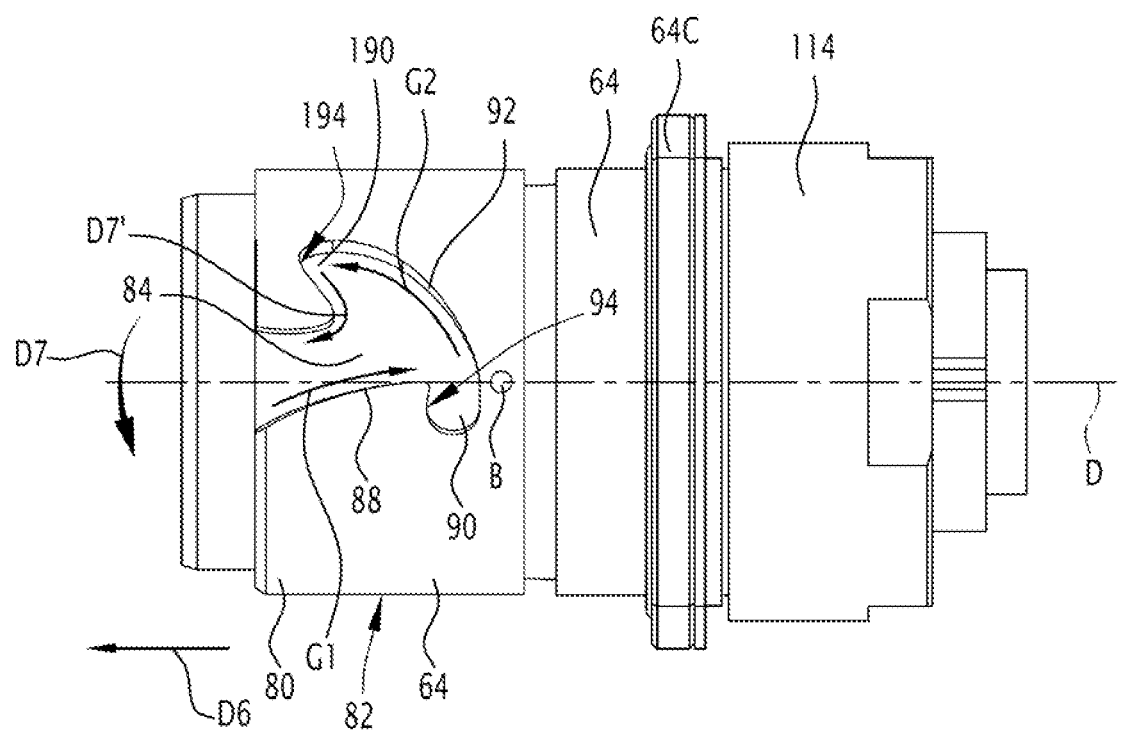

The invention will be better understood upon reading the description which follows, given solely by way of example and made with reference to the appended drawings in which:

FIG. 1 is a perspective view of an assembly according to the invention in the unlocked configuration, FIG. 2 is a perspective view, from another angle, of the assembly shown in FIG. 1, FIG. 3 is a partial view of the first part of the assembly shown in FIGS. 1 and 2, the ring being shown transparently in its rest position, FIG. 4 is a sectional view along a radial plane passing through the connection axis of the assembly shown in FIGS. 1 and 2, FIG. 5 is a partial view of the assembly shown in FIGS. 1, 2 and 4, the pin making a first sliding on the locking ramp, FIG. 6 is a sectional view of the assembly, along a radial plane passing through the pin, the first part and the second part being in the configuration shown in FIG. 5, FIG. 7 is a detail view of the assembly shown in FIGS. 1 and 2, the ring being in the first intermediate position relative to the first part, the pin having almost completed the first sliding on the locking ramp, FIG. 8 is a radial sectional view of the assembly shown in FIGS. 1 and 2, the first part and the second part being in the configuration shown in FIG. 7, FIG. 9 is a radial sectional view of the assembly shown in FIGS. 1 and 2, the first part and the second part being in the locked configuration, the pin being received in the first housing, FIG. 10 is a detail view of the assembly shown in FIGS. 1 and 2, the pin making a second sliding on the unlocking ramp, FIG. 11 is a view similar to FIG. 10, the pin having completed the second sliding along the unlocking ramp, and FIG. 12 is a detail view of the second part of an assembly constituting a variant of the assembly shown in FIGS. 1 to 11, the second part defining an unlocking ramp having a more complex shape than that shown in the FIGS. 1, 7, 10 and 11.

DETAILED DESCRIPTION OF THE INVENTION

With reference to FIGS. 1 to 11, an assembly 10 is described according to the invention.

As visible in FIGS. 1 and 2, the assembly 10 comprises a first part 12 and a second part 14 movable relative to each other in translation along a connection axis D between a locked configuration, shown in FIG. 9, in which the first part and the second part are partly nested one inside the other and locked to one another, and an unlocked configuration, shown in FIGS. 1 and 2, in which the first part and the second part are apart from each other.

The assembly 10 also comprises a ring 16 rotatably mounted on the first part 12 about the connection axis D, and a return system 18 (visible in particular in FIG. 3) designed to exert a return force F1 on the ring 16 towards a position of rest of the ring relative to the first part 12 (shown in FIGS. 1 to 3).

In the example shown, the assembly 10 has a symmetry of order two about the connection axis D, so that it also comprises a second return system 20 (FIG. 4) resulting from the return system 18 by rotating 180° about the connection axis D.

In a variant not shown, the assembly 10 comprises only a single return system, or else has a symmetry of order greater than two about the connection axis D, for example of order three or four. In other words, according to various variations, the assembly 10 may comprise one, three, or four return systems, or even more. The different return systems are deduced from each other by rotations about the connection axis D at angles equal to 360°/N, N being the order of symmetry.

Advantageously, the assembly 10 also comprises an O-ring seal 22 (FIG. 4) fixed to the first part 12 and designed to ensure a seal, in particular against liquids and dust, between the first part 12 and the second part 14 in the locked configuration.

The first part 12 advantageously comprises a mark A and the second part 14 a mark B making it possible to align the first part and the second part during a phase of connection of the assembly 10.

The ring 16 advantageously comprises a mark C making it possible to identify the position of the ring relative to the first part 12.

In the example shown, the first part 12 comprises a male electrical contact 24, and a first electrically insulating sleeve 26 surrounding the male electrical contact 24 about the connection axis D.

According to a variant not shown, the first part 12 comprises a female electrical contact, and the second part 14 a male electrical contact.

According to yet another variant, the first part 12 and the second part 14 do not contain any electrical contacts. In this case, the assembly 10 only makes a mechanical connection of the first part 12 and of the second part 14. The assembly 10 then serves, for example, to ensure the connection between for oil, water or gases such as compressed air.

The male electrical contact 24 is located in a housing 28 defined by first sleeve 26. The male electrical contact 24 extends axially. The male electrical contact 24 comprises an electrically conductive main part 30, and advantageously an insulating end piece 32 intended to protect a user from any electrical contact with the main part 30 in the unlocked configuration.

By "insulator" is meant here an element whose electrical resistivity at 300 K is for example greater than or equal to 105Ω·m.

By "conductor" is meant here an element whose electrical resistivity at 300 K is for example less than or equal to $10^{-5}$ Ω·m.

The male electrical contact 24 is designed to be electrically connected to an electrical cable 34 (FIG. 1) axially inside the first sleeve 26.

The main part 30 defines for example a housing 36 designed to receive the cable 34.

The end piece 32 is advantageously annular in shape about the connection axis D and fixed to an axial end 38 of the main part 30.

The first sleeve 26 is advantageously made up of several parts 26A, 26B, 26C, 26D and 26E fixed to one another.

The first sleeve 26 forms a rail 40 (FIG. 2) configured to slide axially in a groove 42 of the second part 14 when the first part 12 and the second part 14 pass from the unlocked configuration to the locked configuration.

According to a variant not shown, the rail 40 is formed by another portion of the first part 12, for example by electrical contact.

In the example shown, the first sleeve 26 comprises a wall 26E extending at least in part around the connection axis D and defining a slot 44 (FIG. 3) extending perpendicularly to the connection axis D and radially crossed by a pin 46 of the ring 16.

The rail 40 is designed to prevent rotation of the first part 12 relative to the second part 14 about the connection axis D when the first part 12 and the second part 14 pass from the unlocked configuration to the locked configuration.

The ring 16 defines a radially inner surface 48 (FIG. 6) with respect to the connection axis D, and includes at least the pin 46 already mentioned, the pin projecting from the surface 48 towards the connection axis D through the slot 44.

In the example shown, the ring 16 also has a symmetry of order two about the connection axis D, so that it comprises a second pin 50 which is deduced from the pin 46 by a rotation of 180° about the connection axis D.

According to variants not shown, the ring 16 may have only one pin, three pins, four pins or more. The positions of the pins are advantageously deduced from each other by rotations of 360°/N, N being the number of pins.

The return system 18 comprises a groove 52 formed by the first part 12 (here more exactly by the wall 26E of the first sleeve 26), and a spring 54 housed in the groove 52.

The groove 52 is oriented circumferentially about the connection axis D.

The spring 54 has a first end 56 fixed to the first part 12, and a second end 58 fixed to the ring 16.

In the example shown, the spring 54 is designed to work in compression and push the ring 16 back to its position of rest relative to the first part 12, in which the pin 46 abuts against one end 60 of the slot 44.

The second part 14 comprises a female electrical contact 62 designed to receive the male electrical contact 24 in the locked configuration, and a second insulating sleeve 64 surrounding the female electrical contact about the connection axis D.

The female electrical contact 62 is located in a housing 66 defined by the second sleeve 64 and is designed to be electrically connected to an electrical cable 68 (FIG. 1).

The female electrical contact 62 comprises an electrically conductive main part 70 defining a housing 72 designed to receive the electrical cable 68. The female electrical contact 62 advantageously comprises an insulating rod 72 projecting axially from the main part 70 which, with the second sleeve 64, prevents a user from touching the main part 70 when the first part 12 and the second part 14 are in the unlocked configuration.

Advantageously, the main part 70 comprises a plurality of lamellae 74 extending axially and arranged angularly around the connection axis D.

In the locked configuration, the lamellae 74 radially enclose the main part 30 of the male electrical contact 24, and the insulating rod 72 is received in a housing 76 defined by the main part 30 of the male electrical contact 34.

The second sleeve 64 comprises several parts 64A, 64B, 64C and 64D fixed to one another.

The second sleeve 64 advantageously forms a collar 78, for example of square shape when viewed along the connection axis D, designed to allow the second part 14 to be attached to a support, not shown.

The second sleeve 64 comprises a wall 80 extending about the connection axis D and defining a radially outer surface 82 forming a radial recess 84.

The radial recess 84 opens axially from the side of the first part 12. The radial recess 84 has a curvilinear edge 86.

The curvilinear edge 46 forms a locking ramp 88, a first housing 90, and an unlocking ramp 92.

According to a variant not shown, the locking ramp 88, the first housing 90, and the unlocking ramp 92 are not formed by a recess, but by a notch made in the second sleeve 64. The notch defines the curvilinear edge 86.

The locking ramp 88 is designed that a manual displacement in translation (represented by the arrow D1 in FIG. 5) of the first part 12 and of the second part 14 axially relative to each other of the unlocked configuration to an intermediate configuration shown in FIG. 7 causes a first sliding G1 of the pin 46 on the locking ramp 88. The locking ramp 88 is also designed to cause an automatic movement (shown by an arrow D2 in FIG. 5) of the ring 16 angularly in one direction with respect to the first part 12 between the position of rest and a first intermediate position of the ring shown in FIG. 7.

In the first intermediate position, the angular displacement of the ring 16 relative to the first part 12 passes through a local maximum.

The locking ramp 88 and the first housing 90 are so designed that manual movement (shown by an arrow D3 in FIG. 7) of the first part 12 and of the second part 14 axially relative to each other from the intermediate configuration (shown in FIG. 7) to the locked configuration allows automatic displacement (represented by an arrow D4 in FIG. 7) of the ring 16 angularly in the opposite direction relative to the first part 12, from the first intermediate position to a locking position (shown in FIG. 8) under the action of the return system 18.

In the locking position of the ring 16, the pin 46 is received in the first housing 90 which defines an axial stop 94 designed to block the pin 46 axially relative to the second part 14 and prevent dislocation of the assembly 10.

The movement of the ring 16 from the intermediate position, shown in FIG. 7, to the locking position, shown in FIG. 8, is designed to cause a displacement D4' of the pin 46 at the end of which the pin 46 is received in the first housing 90.

In the example shown, the locking position of the ring 16 is substantially identical to the position of rest. In other words, the passage of the ring 16 from the position of rest shown in FIG. 5, to the intermediate position shown in FIG. 7 corresponds to an angular movement in the direction D2, while the movement of the ring 16 from the intermediate position to the locking position shown in FIG. 8 corresponds to a reverse angular displacement in direction D4 relative to the first part 12.

The unlocking ramp 92 is so designed that a manual movement (represented by an arrow D5 in FIG. 10) of the ring 16 in rotation bout the connection axis D relative to the first part 12 in the same direction as during the first sliding G1, from the locking position shown in FIG. 9, the pin 46 exits the first housing 90, and causes a second sliding G2 of the pin 46 on the unlocking ramp 92, the unlocking ramp 92 reacting axially (force R2 shown in FIG. 10) to move the first part 12 and the second part 14 axially apart from each other from the locked configuration (arrow D6 in FIG. 10).

The second sliding G2 of the pin 46 on the unlocking ramp 92 from the first housing 90 is designed to cause an axial sliding G3 (FIG. 9) of the seal 22 on a sealing surface 96 defined by the second sleeve 64 and designed to interact with the seal in the locked configuration.

The unlocking ramp 92 is curved, and forms an angle α with the connection axis D decreasing as one moves away from the first housing 90.

The unlocking ramp 90 advantageously comprises a portion 98 proximal to the first housing 90, the proximal portion 98 forming an angle β less than 40°, preferably 20° with any plane P perpendicular to the connection axis D.

In other words, the unlocking ramp 92 has a proximal part 98 which is very inclined with respect to the connection axis D, and therefore very slightly inclined with respect to any plane P perpendicular to the connection axis D, so that the reaction R2 of the unlocking ramp 92 on the pin 46 is very strong at the start of the second sliding G2. Then the unlocking ramp 92 gradually curves until it becomes, in the example shown, almost parallel to the connection axis D in the vicinity of the position of the pin 46 in FIG. 11.

The operation of the assembly 10 is deduced from its structure and will now be described briefly.

Initially, the first part 12 and the second part 14 are for example in the unlocked configuration shown in FIGS. 1 and 2. The male electrical contact 24 and the female electrical contact 62 are disconnected. The electrical cables 34 and 68 are therefore not in electrical contact with each other.

Then, in a connection phase of the assembly 10, the user (not shown) moves the first part 12 and the second part 14 of the unlocked configuration progressively towards the locked configuration shown in FIG. 9, passing through the intermediate configuration shown in FIGS. 7 and 8.

The user aligns the marks A and B and a manual displacement D1 (FIG. 5) of the first part 12 and the second part 14 is carried out axially with respect to one another from the unlocked configuration to the configuration shown in FIG. 5. The rail 40 slides in the groove 42, which guides the translational movement of the first part 12 and the second part 14 with respect to each other along the connection axis D and prevents rotation of the first part 12 relative to the second part 14 about the connection axis D.

The pin 46, as shown in FIG. 5, comes into contact with the locking ramp 88 and performs the first sliding G1 on the locking ramp. The locking ramp 88 reacts on the pin 46 and causes the automatic displacement D2 of the ring 16 from its position of rest relative to the first part 12 towards its first intermediate position shown in FIG. 7. During the first sliding G1, the pin 46 moves in the slot 44 from the position of rest also shown in FIG. 3, in which the pin 46 abuts against the end 60 of the slot 44. During the first sliding G1, the spring 54 of the return system 18 compresses.

The transition to the locked configuration continues with the manual displacement D3 (FIG. 7) of the first part 12 in axial translation relative to the second part 14. This causes the automatic displacement D4 of the ring 16 angularly in the opposite direction relative to the first part 12, from the first intermediate position (shown in FIG. 7) to the locking position (shown in FIG. 9). Compared to the second part 14, the pin 46 performs the movement D4' shown in FIG. 7 and is received in the first housing 90. The ring 16 is then in the locking position. In this position, the pin 46 locks the first part 12 relative to the second part 14, because the pin 46 abuts against the abutment surface 94.

During the first sliding G1 and the displacement D4' of the pin 46, the male contact 24 is inserted between the lamellae 74 of the female electrical contact 62 and an electrical contact is established.

In a phase of disconnection of the assembly 10, the user performs the manual displacement D5 (FIG. 10) of the ring 16 in rotation relative to the first part 12 about the connection axis D. The first part 12 is blocked in rotation with respect to the second part 14 by the rail 40 located in the groove 42. This leaves the pin 46 from the first housing 90 and causes the second sliding G2 of the pin on the unlocking ramp 92. The unlocking ramp 92 reacts axially on the plane 46 by applying the force R2 to it. The axial component of the force R2 communicates to the first part 12 and moves the first part 12 away from the second part 14 axially from the locked configuration. This corresponds to arrow D6 in FIGS. 10 and 11.

Due to the curvature of the unlocking ramp 92, the dislocation force which is applied to the first part 12 is initially very strong and is reduced as the second sliding G2 progresses.

At the start of the dislocation movement, the pin 46 traverses the proximal part 98 of the unlocking ramp 92. The reaction applied to the first part 12 is then very strong and allows the seal 22 to slide over the sealing surface 96 (see sliding G3 in FIG. 9).

Then, when the seal 22 has left the seal surface 96, the initially large dislocation force is no longer necessary. Pin 46 continues to travel the rest of the unlocking ramp 92 and arrives in the position shown in FIG. 11, in which it is located at the other end of the slot 44 relative to the end 60.

The user may then exert a manual translational action on the first part 12 to continue moving it away from the second part 14.

Thanks to the characteristics described above, the connection and disconnection of the first part 12 and of the second part 14 are facilitated. The locking ramp 88 and the first housing 90 together with the pin 46 form an "automatic" bayonet system, since it is not necessary to turn the ring 16 with respect to the first part 12 to obtain the locking. On the contrary, locking takes place automatically thanks to the first sliding G1 and then the movement D4' of pin 46.

In addition, the unlocking is easy, thanks to the interaction of the pin 46 with the unlocking ramp 92. This interaction creates a force for dislodging the first part 12 initially very strong, making it possible to overcome the friction of the seal 22 on the sealing surface 96.

With reference to FIG. 12, a second part 114 will now be described constituting a variant of the second part 14 shown in FIGS. 1 to 11. The second part 114 is similar to the first part 14. Similar elements bear the same numerical references and will not be described again. Only the differences will be described in detail below.

The recess 84 of the second part 114 also defines a second housing 190 designed to receive the pin 46 at the end of the second sliding G2.

The second housing 190 defines a second axial stop 194 blocking the pin 46 axially with respect to the second part 114 in the direction of dislocation of the assembly 10.

The second housing 190 is further designed to immobilize the ring 16 in rotation in a second intermediate position (which is approximately that shown in FIG. 11) with respect to the first part 12 when the pin 46 is in the second housing 190.

The second housing 190 is so designed that a manual displacement D7 of the ring 16 in rotation about the connection axis D relative to the first part 12 in the same direction as the displacement D4 shown in FIG. 7 exits the pin 46 from the second housing 190 and allows the axial displacement D6 of the first part 12 and of the second part 114 with respect to each other towards the unlocked configuration.

When the pin 46 is received in the second housing 190, i.e. when the ring 16 is in the second intermediate position, the dislocation of the first part 12 axially relative to the second part 114 is temporarily blocked, until the user applies the movement D7 for unlocking the ring 16. This unlocking movement causes a movement D7' (FIG. 12) of the pin 46 relative to the second part 114. At the end of this movement D7', the movement of the first part 12 and of the second part 114 to the unlocked configuration may continue.

Thanks to the second housing 190, the dislocation of the first part 12 relative to the second part 114 is temporarily interrupted. The user, after having imparted the rotational movement D5 on the ring 16, has time to enter the first part 12 and then to impart the reverse rotational movement D7 before manually recovering the first part 12. This makes it possible to decompose the dislocation into two phases and better manual control.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. Assembly comprising a first part and a second part movable relative to each other in translation along a connection axis between a locked configuration, in which the first part and second part are partly nested one inside the other and locked to each other, and an unlocked configuration, in which the first part and the second part are separated from each other, wherein:

the first part comprises one of a rail and a groove, and the second part comprises the other of a rail, and a groove wherein the rail is designed to slide axially in the groove when the first part and the second part pass from the unlocked configuration to the locked configuration, the assembly comprises a ring rotatably mounted on the first part about the connection axis, the ring defining a radially inner surface with respect to the connection axis and comprising at least one pin, the pin projecting from the radially inner surface, the second part defines a locking ramp, a first housing and an unlocking ramp, and the assembly comprises a return system to exert a return force on the ring to a position of rest, the locking ramp and the first housing being configured so that a manual displacement of the first part and the second part axially relative to each other from the unlocked configuration to an intermediate configuration causes a first sliding of the pin on the locking ramp, and an automatic displacement of the ring angularly in one direction with respect to the first part between the position of rest and a first intermediate position, and so that a manual displacement of the first part and the second part axially relative to each other from the intermediate configuration to the locked configuration allows an automatic displacement of the ring angularly in the opposite direction with respect to the first part, from the first intermediate position to a locking position under the action of the return system, the pin being received in the first housing when the ring is in the locking position, the first housing defining a first axial stop designed to block the pin axially relative to the second part, the unlocking ramp being so designed that a manual movement of the ring in rotation about the connection axis in said direction with respect to the first part from the locking position, makes the pin exit the first housing and causes a second sliding of the pin on the unlocking ramp, the unlocking ramp reacting axially on the pin to move the first part and the second part axially away from each other from the locked configuration.

2. Assembly according to claim 1, wherein:

the first part comprises one of a male electrical contact and a female electrical contact, and a first electrical insulating sleeve surrounding said electrical contact about the connection axis, the second part comprises the other of a male electrical contact and a female electrical contact, and a second electrical insulating sleeve surrounding said electrical contact about the connection axis, the electrical contact of the first part being in electrical contact with the electrical contact of the second part in the locked configuration, and separated from the electrical contact of the second part in the unlocked configuration.

3. Assembly according to claim 1, wherein the second part comprises a wall extending at least in part about the connection axis, the wall defining a radially outer surface forming a radial recess, the recess opening axially on the side of the first part, the locking ramp, the first housing and the unlocking ramp being formed by a curvilinear edge of the recess.

4. Assembly according to claim 1, wherein the first part comprises a wall extending at least in part about the connection axis, the wall defining a slot extending perpendicularly to the connection axis, the pin radially passing through this slot.

5. Assembly according to claim 1, wherein the return system comprises a groove formed by the first part or the ring and oriented circumferentially about of the connection pin, and a spring housed in the groove, the spring having a first end fixed to the first part, and a second end fixed to the ring.

6. Assembly according to claim 1, wherein the unlocking ramp is curved, the unlocking ramp forming an angle with the connection axis reducing as one moves away from the first housing.

7. Assembly according to claim 1, wherein the unlocking ramp comprises a proximal portion relative to the first housing, the proximal portion forming an angle less than 40° with any plane perpendicular to the connection axis.

8. Assembly according to claim 1, further comprising at least one O-ring seal fixed to one of the first part and the second part about the connection axis, the other of the first part and second part defining a sealing surface designed to interact with the seal in the locked configuration, the second sliding of the pin on the unlocking ramp from the first housing causing an axial sliding of the seal on the sealing surface and an axial separation between the seal and the sealing surface.

9. Assembly according to claim 1, wherein the second part also defines a second housing designed to receive the pin at the end of the second sliding, the second housing defining a second axial stop blocking the pin axially relative to the second part, the second housing being further designed to immobilize the ring rotating in a second intermediate position relative to the first part when the pin is in the second housing, the second housing being so designed that a manual movement of the ring rotating about the connection axis relative to the first part in said opposite direction from the second intermediate position exits the pin from the second housing and allows an axial displacement of the first part and of the second part relative to each other to the unlocked configuration.

10. Method of locking-unlocking a first part and a second part movable relative to each other in translation along a connection axis between a locked configuration, in which the first part and the second part are partly nested one inside the other and locked to each other, and an unlocked configuration, in which the first part and the second part are spaced apart, the first part comprising one of a rail and a groove, and the second part comprising the other of a rail and a groove, a ring being rotatably mounted on the first part about the connection axis, the ring defining a radially inner surface with respect to the connection axis and comprising at least one pin, the pin projecting from the radially inner surface, the second part defining a locking ramp, a first housing and an unlocking ramp, a return system exerting a return force on the ring towards a position of rest with respect to the first part, the method comprising the following steps:

sliding of the rail axially in the groove while the first part and the second part pass from the unlocked configuration to the locked configuration, manual displacement of the first part and the second part axially relative to each other from the unlocked configuration to an intermediate configuration, due to said manual displacement, first sliding of the pin on the locking ramp, and automatic displacement of the ring angularly in one direction relative to the first part between the position of rest and a first intermediate position, manual movement of the first part and the second part axially relative to each other from the intermediate configuration to the locked configuration, due to said manual displacement, automatic displacement of the ring relative to the first part angularly in the opposite direction from the first intermediate position to a locking position under the action of the return system, the pin being received in the first housing when the ring is in the locking position, the first housing defining a first axial stop blocking the pin axially relative to the second part, manual movement of the ring in rotation about the connection axis in said direction relative to the first part from the locking position, and due to said manual movement, exit of the pin from the first housing and second sliding of the pin on the unlocking ramp, the unlocking ramp reacting axially on the pin to move the first part and the second part axially away from each other from the locked configuration.

11. Assembly according to claim 7, wherein the unlocking ramp comprises a proximal portion relative to the first housing, the proximal portion forming an angle less than 20° with any plane perpendicular to the connection axis.

* * * * *